May 6, 1924.
E. FERRABINO
1,492,706
WHEEL
Filed June 20, 1922
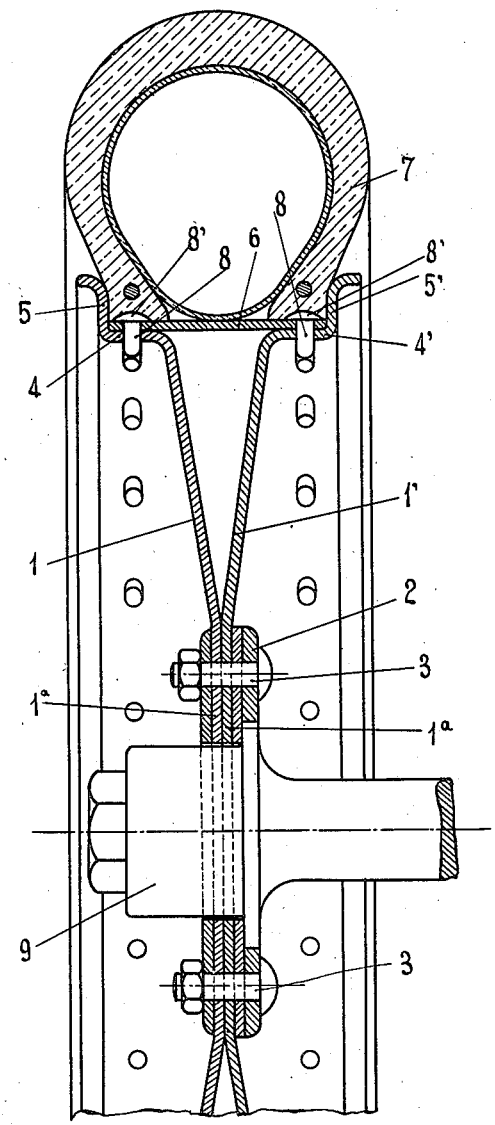
Inventor:
E. Ferrabino.
By
Lawrence Langner
Atty Patented May 6, 1924.

1,492,706

UNITED STATES PATENT OFFICE.

EDOARDO FERRABINO, OF TURIN, ITALY.

WHEEL.

Application filed June 20, 1922. Serial No. 569,743.

*To all whom it may concern:*

Be it known that I, EDOARDO FERRABINO, a subject of the King of Italy, residing at Turin, Italy, have invented a new and useful Improvement in Wheels; and I do hereby declare the following to be a full, clear, and exact description of the same.

The present invention relates to wheels for road vehicles having removable rims for the reception of pneumatic tires, and has for its object to produce an improved wheel of said kind provided with means for easily removing and putting in position the rim and the tire. In the figure of the annexed drawing is shown by way of example and in central section an embodiment of wheel according to this invention, the construction illustrated being particularly adapted for tires of the kind known as straight side tires.

As shown on the drawing, the wheel comprises two disks 1—1' which are provided with central perforated flat annular portions 1ª—1ª for location on and engagement with a wheel hub 9 and are adapted to be fastened to the said hub by means of bolts 3 interconnecting said disks 1—1' with a flange 2 of the hub.

Each of said disks is of conical or bell shape in its central portion and at its outer edge is provided with a flange 4—4' having an upturned edge 5—5', these edges providing abutments for the sides of the tire cover 7.

A removable rim 6 is located on said flanges 4—4' and between said upturned edges 5—5', and is engaged therewith by means of headed pins 8 passing through registering holes of said rim 6 and flanges 4—4', the heads 8' of said pins abutting against the rim 6 and being clamped between the rim and the cover 7 which is located thereon in a manner now to be described.

For mounting the described wheel, the rim 6 is first engaged with one of the disks, as 1', by means of a row of pins 8, then the tire is positioned on the rim 6 and the other disk, as 1, is put in position with its flange 4 within the rim 6 and the edge 5 abutting against it, and finally the pins 8 are inserted in the registering holes of the flange 4 and rim 6, the tire being collapsed for this purpose as permitted by it being deflated at this time.

Finally the tire is inflated when its edges engage the heads 8' of the pins 8 and exert a strong pressure thereon, thus holding them safely in position to interconnect the rim 6 with the disks 1—1'.

When the tire is to be removed from the wheel, it is deflated and then collapsed to leave clear one row of pins 8; thereafter these pins are removed by pushing on their ends which project over the flange 4, and finally the desired disk is removed, thus leaving the tire free to be taken off from the wheel.

The disks 1—1' of the wheel are strongly held together when in use by the bolts 3 connecting them with the hub flange 2.

Of course the present invention is not confined to the described embodiment, as it comprises also all the modifications lying within the spirit of the appended claims.

In the wheel according to the present invention the rim is easily taken off and tires of very large size may be mounted thereon, the engaging means, as pins 8, being safely held in position by the tire when inflated without becoming clamped in their seats, as in the case of screws and bolts.

What I claim as my invention and desire to secure by United States Letters Patent is:

1. In a wheel for pneumatic tires, a rim, two discs adapted to be connected with a hub, each of said discs having a cylindrical flange and a radial edge at its periphery, said flanges entering said rim and said edges projecting radially therefrom, and means for engaging together said flanges and rim, said means for at least one of said flanges being held in position by the tire when in inflated condition.

2. In a wheel for pneumatic tires, a rim, means for connecting said rim with a hub, said means comprising cylindrical flanges entering said rim and edges projecting radially therefrom, and means for engaging together said flanges and rim said means for at least one of the flanges being held in position by the tire when in inflated condition.

3. In a wheel for pneumatic tires, a rim, a disk having means for connection with a hub, a cylindrical flange and a radial edge at the periphery of said disk, said flange contacting with said rim and said edge projecting radially therefrom, and means for engaging together said flange and rim, these means being held in position by the tire when in inflated condition.

4. In a wheel for pneumatic tires, a rim, disks having means for connection with a hub, a cylindrical flange and a radial edge at the periphery of each disk, the flanges contacting with said rim and said edges projecting radially therefrom, and means for engaging together said flanges and rim, said means being held in position by the tire when in inflated condition.

5. In a wheel for pneumatic tires, a rim, a disk having means for connection with a hub, a cylindrical flange and a radial edge at the periphery of said disk, said flange contacting with said rim and said edge projecting radially therefrom, said rim and flange having registering holes, and headed pins entering said holes to interengage said parts, the pin heads being clamped in position by the tire beads when the tire is in inflated condition.

6. In a wheel for pneumatic tires, a rim, two disks each having means for connection with a hub, a cylindrical flange and a radial edge at the periphery of each disk, said flanges contacting with said rim and said edges projecting radially therefrom, said rim and flanges having registering holes, and headed pins entering said holes to interengage said parts, the pin heads being clamped in position by the tire beads when the tire is in inflated condition.

In testimony whereof, I have signed my name to this specification.

EDOARDO FERRABINO.